Dec. 9, 1930.　　　T. L. GREEN　　　1,784,432
BISCUIT CUTTING AND EMBOSSING MACHINE
Filed June 1, 1929　　　7 Sheets-Sheet 6

INVENTOR:
Thomas Luther Green
BY Henry T. Williams
ATTORNEY

Patented Dec. 9, 1930

1,784,432

UNITED STATES PATENT OFFICE

THOMAS LUTHER GREEN, OF INDIANAPOLIS, INDIANA

BISCUIT CUTTING AND EMBOSSING MACHINE

Application filed June 1, 1929. Serial No. 367,634.

The invention to be hereinafter described relates to a machine for cutting and embossing biscuits, and is an improvement upon the machine disclosed in Letters Patent No. 1,660,553, granted to me February 28, 1928.

In said machine a sheet of dough or other plastic material is fed by an endless web or apron beneath vertically reciprocating cutters and embossers mounted on a carrier, which in the case of a continuously fed apron is reciprocated so that the cutters and embossers are moved in unison with the travel of the sheet when acting thereon. A cross-head reciprocates vertically on the carrier, and detachably connected with the cross-head is a unit comprising a cutter-head carrying cup-shaped cutters, an embosser-head carrying embossers within the cutters, and a clearer plate. The embosser-head is supported on the clearer plate by coil springs encircling studs mounted on and projecting up from the clearer plate and having heads at the upper ends thereof. The clearer plate is carried by the cutter-head and is provided with studs rising from the clearer plate and having heads at the upper ends thereof. Coil springs encircle these studs and urge the clearer plate downward relatively to the cutter-head until limited by engagement of the stud heads with the cutter-head.

In said machine, on downward movement of the cross-head toward the apron, the clearer plate engages and is arrested by stops on the carrier adjacent opposite edges of the apron. The cross-head carries toggles having shoes at the lower ends thereof free from, but adapted to engage the embosser-head, so that on arrest of the clearer plate and continued downward movement of the cross-head, the shoes engage the embosser-head and press the same downward against the opposition of the coil springs which are interposed between the clearer plate and the embosser-head, thereby energizing said springs. The instant the embossers have made their impress upon the dough sheet, the toggles are buckled, and the energized springs become effective quickly to move the embossers up away from the dough sheet. To intermittently buckle the toggles and release the shoes from the embosser-head, a latch trip mechanism is employed, which is a good operable means for the purposes, but objectionable vibration, noise and wear are occasioned thereby.

In my copending application Serial No. 353,571, filed April 8, 1929, is disclosed improved means for controlling the toggles comprising a pair of eccentrics located within the cross-head and connected to the hinge pins of the toggles by connecting rods. To give the eccentrics an oscillatory motion for alternately buckling and approximately straightening the toggles, a double crank motion is provided and so designed that high speed rocking movement is given to the eccentrics quickly to buckle the toggles, snatch the shoes up, and allow lifting of the embossers by the embosser-head springs the instant the embossers have made their impress on the dough sheet.

A purpose of the present invention is to further simplify and modify the machine, and more particularly the means for controlling the embosser-head. The construction is such that the embosser-head is positively reciprocated vertically relatively to the cutter-head, and the embosser-head lifting springs and parts associated therewith employed in the machines above referred to, are eliminated.

The character of the invention may be best understood by reference to the following description of one good embodiment thereof shown in the accompanying drawings, wherein.

Figure 1:
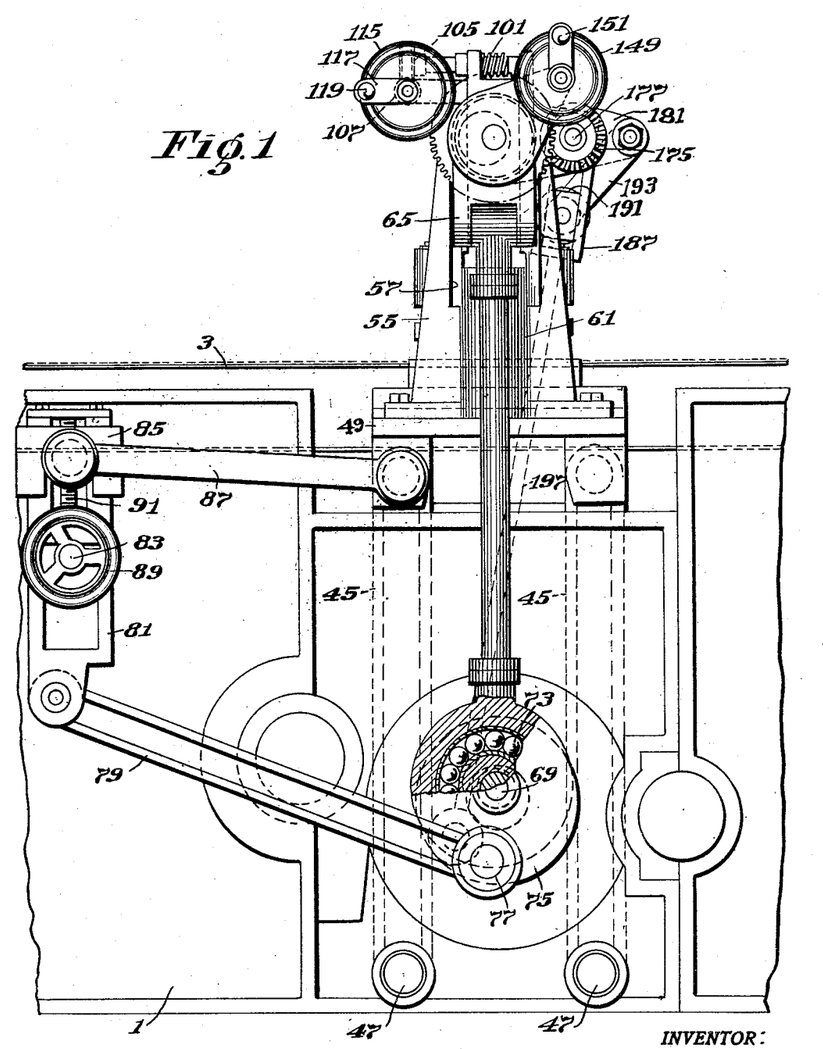
Fig. 1 is a front elevation of a portion of a biscuit cutting and embossing machine embodying the invention.

Referring to the drawings, the portion of the biscuit cutting and embossing machine shown therein as one good form of the invention comprises a pair of side plates 1 (Figs. 1 and 2) which extend the length of the machine and carry the usual rollers and driving mechanism (not shown) for causing the travel of the endless apron 3, the upper run of which conveys the dough sheet beneath the cutters and embossers.

Cutters 5 (Figs. 2, 12 and 13) are provided, in the present instance of cup form. Within the cutters are embossers 7, in the present instance of plunger form. The cutters are secured to a channel-shaped cutter-head 9 provided with a pair of yokes 11 bridging the flanges of the cutter-head adjacent opposite ends thereof. The embossers are secured to the lower ends of stems 13 which are entered through holes in the bottom of the cutter-head, the upper ends of said stems being secured to an embosser-head 15 vertically reciprocable between the flanges of the channel-shaped cutter-head, and prevented from moving longitudinally relatively to the cutter-head by ribs 16 (Fig. 13a) rising from the cutter-head and engaging ends of the embosser-head.

Beneath the cutter-head is a clearer plate 17 having holes for receiving the cutters, and secured to and rising from the clearer plate are studs 19 which pass through pockets 21 in the cutter-head and have heads 23 at the upper end thereof. Coil springs 25 encircle the studs, enter the pockets, are confined between the clearer plate and the upper ends of the pockets, and urge the clearer plate downward until limited by engagement of the stud heads 23 with the upper surfaces of the cutter-head flanges.

Figure 2:
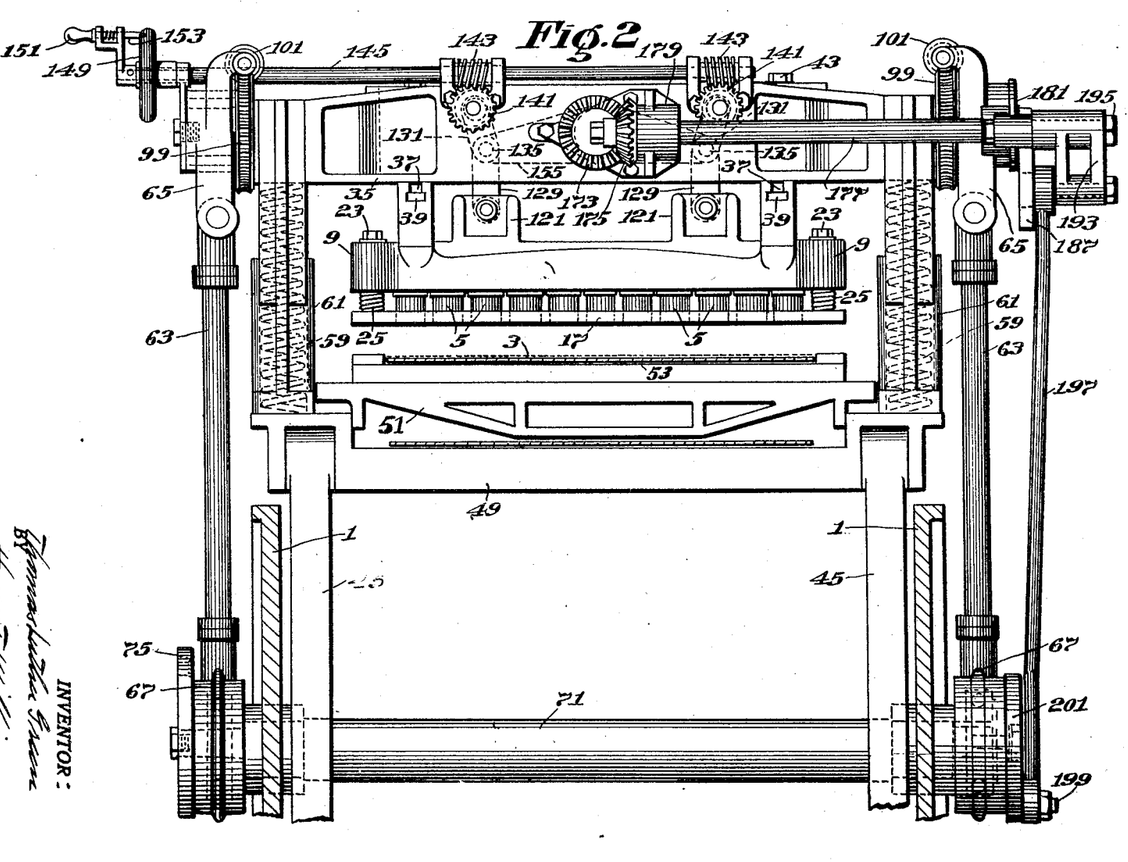
Fig. 2 is a vertical transverse section through the machine showing the cross-head, the cutter and embosser unit and other parts in side elevation.
Figures 3, 4, 5:
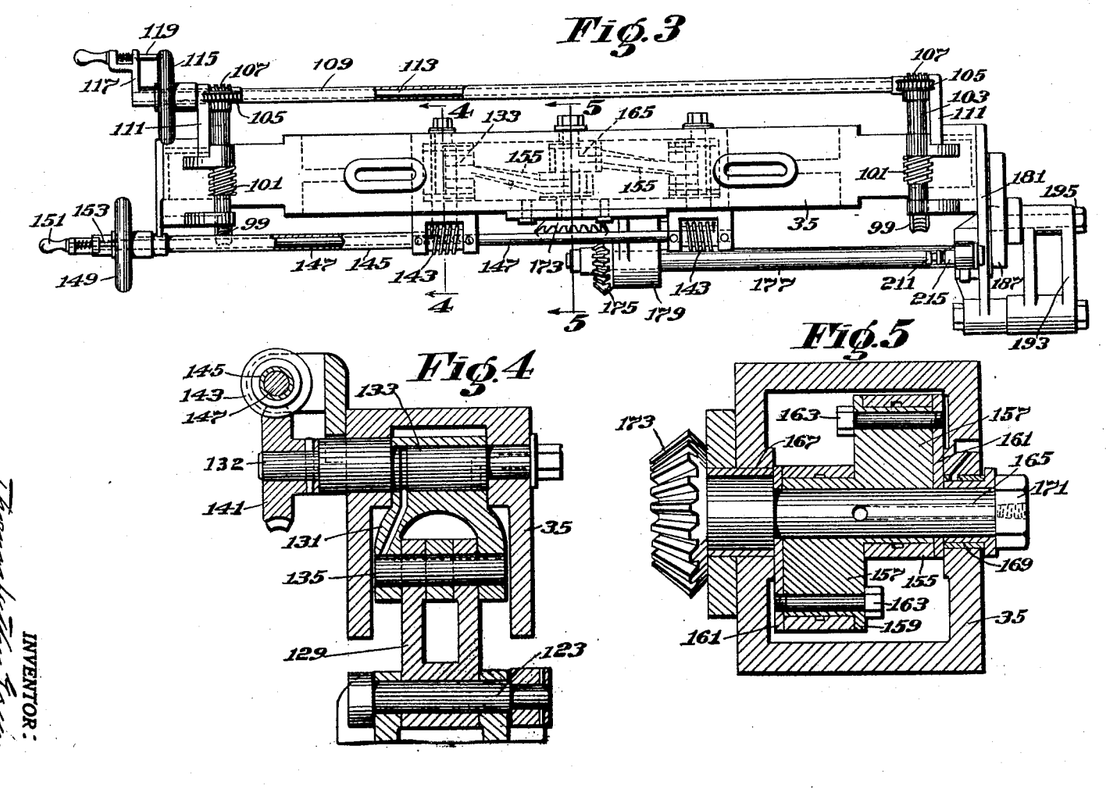
Fig. 3 is a plan of the cross-head, and shows the devices for alining the cross-head with the bed plate, and for adjusting the toggles and the embosser-head for embossing dough sheets of various thicknesses and for making impressions of various depths thereon.
Fig. 4 on an enlarged scale is a transverse section taken on line 4—4 of Fig. 3.
Fig. 5 on an enlarged scale is a transverse section taken on line 5—5 of Fig. 3.
Figures 12, 13, 13A:
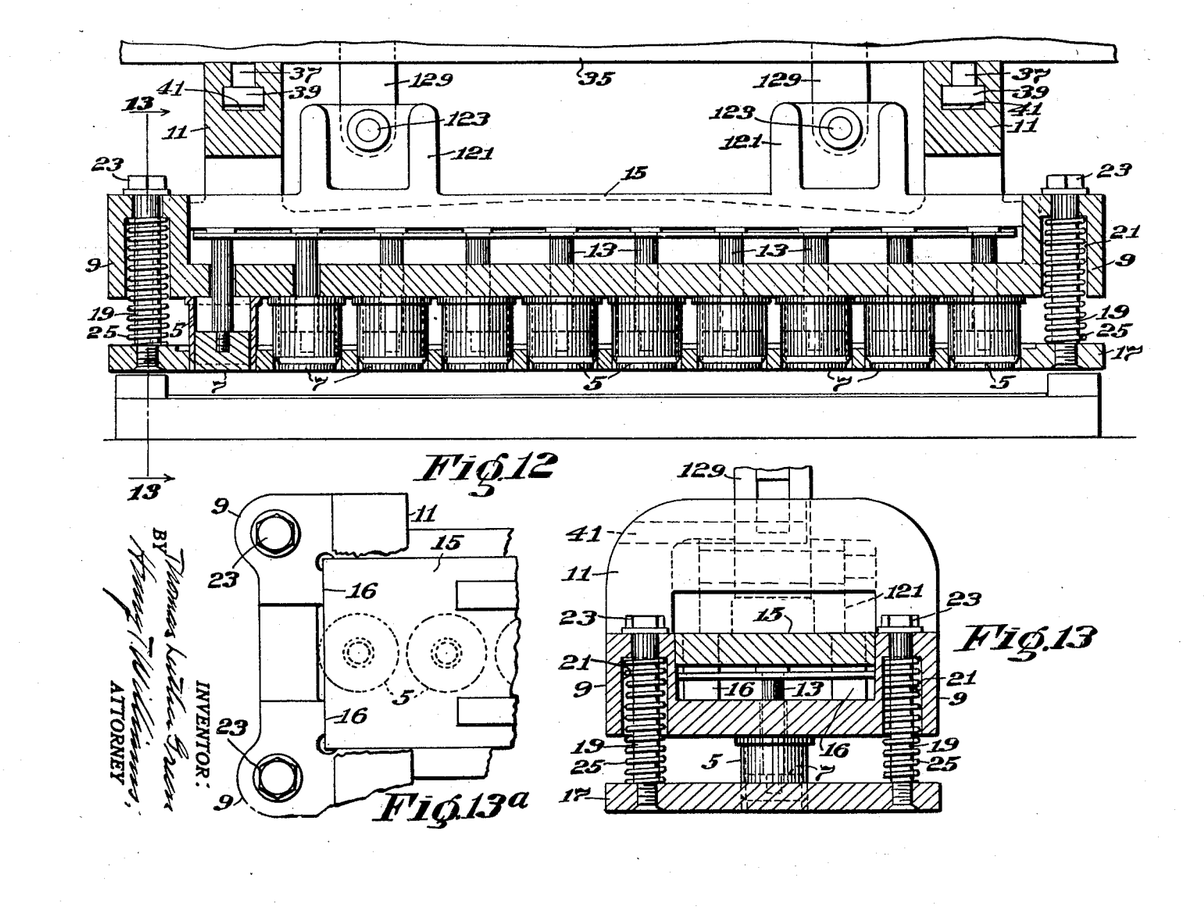
Fig. 12 is a view partly in vertical section and partly in elevation of the unit comprising the head carrying the cutters, the head carrying the embossers, the clearer plate and coil springs for the latter.
Fig. 13 is a vertical transverse section taken on line 13—13 of Fig. 12.
Fig. 13a is a plan of a portion of the cutter and embosser unit.

The cutter carrying head, the embosser carrying head, the clearer plate and the studs and springs for the latter constitute a unit adapted to be detachably secured to a cross-head 35 (Figs. 2, 3 and 12). To accomplish this, bolts 37 are provided extending vertically through the cross-head and having at their lower ends heads 39 entered into horizontal slots 41 in the cutter-head yokes 11 referred to, said bolts having nuts 43 engaging the top of the cross-head. The construction is such that the unit may be presented to the cross-head and adjusted laterally to cause the slots 41 to slide along the bolt heads 39 until limited by engagement of the ends of the slots with the bolts. Thereupon the nuts 43 may be tightened securely to connect the unit to the cross-head. The machine may be equipped with a complement of cutter and embosser units for work of varying character, the construction being such that one unit may be quickly and easily substituted for another.

The cross-head is mounted on a carrier reciprocable in a horizontal direction so that the cutters and embossers may be moved in unison with the continuously travelling apron and dough sheet while acting on the latter. This carrier comprises pairs of rocker arms 45 (Figs. 1 and 2) at opposite sides of the machine, and adapted to oscillate with parallel motion about the axes of shafts 47 mounted on the side plates of the machine. The upper ends of the rocker arms are connected to a saddle 49 carrying a bed plate 51 over which the upper run of the apron passes, a suitable pad 53 being interposed between the bed plate and the upper run of the apron.

Mounted on the saddle at opposite ends thereof are stands 55 having guideways 57 in which the cross-head is adapted to reciprocate vertically. Coil springs 59 are mounted in deep cups 61 and have upper ends engaging the cross-head yieldingly to support the latter.

To reciprocate the cross-head in the guideways of the stands, connecting rods 63 (Figs. 1 and 2) are provided having heads 65 connected to the cross-head, and heads 67 provided with straps receiving crank wrist pins 69 on main shaft 71 journalled in bearings in the side plates and driven in any suitable manner. Ball bearings 73 are provided between the straps and wrist pins.

The means for horizontally reciprocating the cutter and embosser carrier comprises a disk 75 mounted on the front end of the main shaft 71 and having a wrist pin 77 connected by a connecting rod 79 with the lower end of one of a pair of rocker arms 81 mounted on a shaft 83. On the upper ends of the rocker arms are blocks 85 connected by links 87 with the saddle 49. The extent of oscillation of the cutter and embosser carrier may be varied by adjusting the blocks 85 along the rocker arms by means of a hand wheel 89 operating through mitre gears and screws 91 as is understood in the art.

Figures 6, 7, 8:
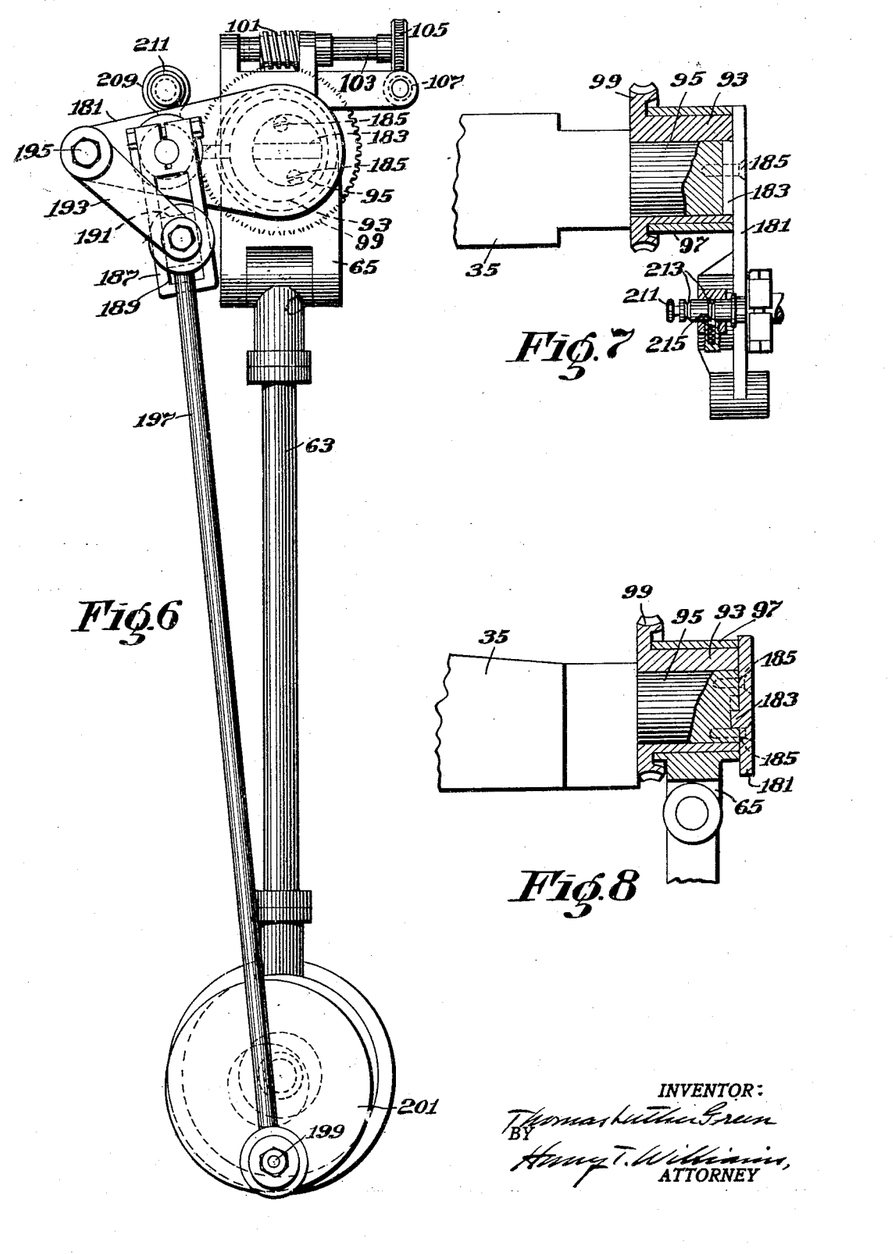
Fig. 6 is an elevation showing the mechanism for oscillating the mitre gears, rock shafts and eccentrics.
Fig. 7 is a plan of an end portion of the cross-head showing one of its eccentric adjusting sleeves in section, and showing the bracket carrying part of the mechanism for oscillating the mitre gear shafts.
Fig. 8 is an elevation of the portion of the cross-head shown in Fig. 7, and a vertical section through the eccentric sleeve and bracket.
Figure 9:
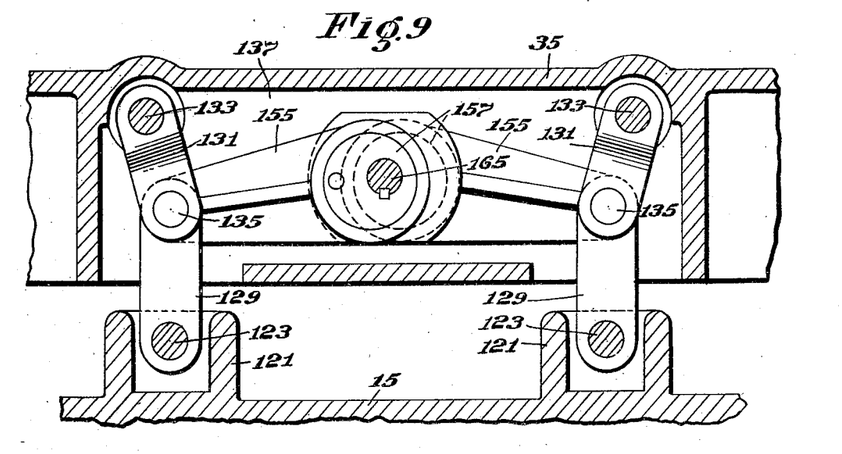
Fig. 9 on an enlarged scale is a vertical section through the cross-head box and showing the positions of the eccentrics, connecting rods and toggles when the latter are in approximately straightened condition.
Figure 10:
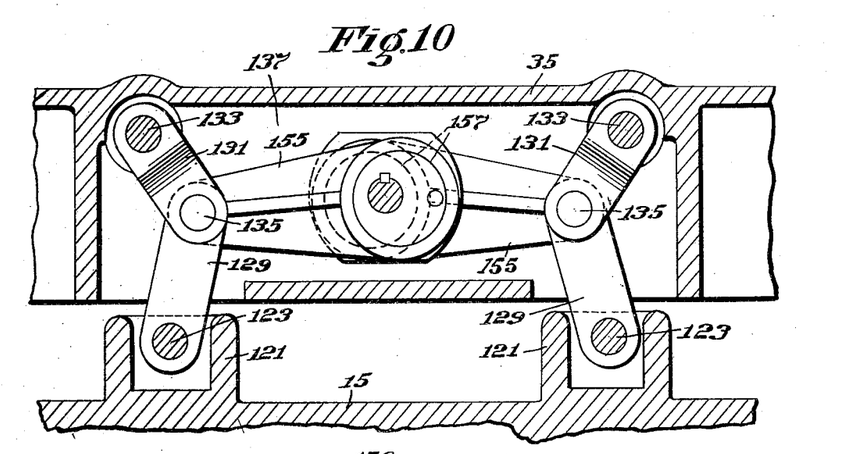
Fig. 10 is a view similar to Fig. 9 showing the positions of the eccentrics, connecting rods and toggles when the latter are in buckled condition.
Figure 11:
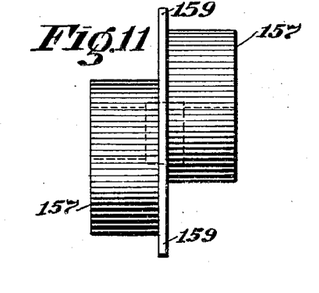
Fig. 11 is a view of the two eccentrics.

It is desirable to adjust the cross-head in order that it may be properly alined with respect to the bed plate and the dough sheet. To accomplish this, eccentric sleeves 93 (Figs. 6, 7 and 8) are interposed between the trunnions 95 of the cross-head and bearings 97 in the upper connecting rod heads 65. Formed integrally with the eccentric sleeves are worm gears 99 (Figs. 3, 7 and 8) meshing with worms 101 on short shafts 103 journalled in bearings on the upper connecting rod heads 65. Fast on said short shafts are worm gears 105 meshing with worms 107, one on a sleeve shaft 109 journalled in bearings in brackets 111 projecting from the upper connecting rod heads 65, and the other on a shaft 113 in the sleeve shaft. Fast on the sleeve shaft 109 is a hand wheel 115, and fast on the shaft 113 is a crank 117. The hand wheel and crank may be connected by a spring-pressed pin 119 when it is desired equally to adjust the ends of the cross-head, and on withdrawal of the spring-pressed pin from the hand wheel, said ends may be adjusted independently as desired.

Next will be described the mechanism for reciprocating the embosser-head relatively to the cutter-head. To accomplish this lugs 121 (Figs. 2, 9, 10 and 12) are formed integrally with the embosser-head and are provided with pins 123 (Fig. 4) connected to toggles each comprising a lower link 129 and an upper link 131 pivotally connected to shafts 132 journalled in bearings in the cross-head. The links 129 and 131 have meeting overlapping forked ends through which pass hinge pins 135. The cross-head is formed to provide a box 137 which receives the toggles and has openings through which the lower links of the toggles protrude.

The toggles may be adjusted in order that they may be set properly for embossing dough sheets of different thicknesses and for causing the embossers to make impresses in the dough sheet of various depths. Also this adjustment of the toggles will compensate for any variation in the heights of the yokes which connect the cutter and embosser unit to the cross-head.

To accomplish this adjustment, the toggle carrying shafts 132 have eccentric portions 133, and ends of the shafts extend out from the cross-head and have fast thereon worm gears 141 meshing with worms 143 (Figs. 2 and 4), one on a sleeve shaft 145 journalled in bearings on the cross-head and the other on a shaft 147 having a portion thereof in the sleeve shaft 145. Fast on the sleeve shaft 145 is a hand wheel 149, and fast on the shaft 147 is a crank 151. The hand wheel and crank may be connected by a spring-pressed pin 153 when it is desired equally to adjust the toggles, and said pin may be withdrawn from the hand wheel independently to adjust the toggles as desired.

The hinge pins 135 of the toggles are connected by connecting rods 155 with a pair of eccentrics 157 (Figs. 5, 9, 10 and 11) having inner flanges 159 formed integrally therewith, and flanges 161 secured to the eccentrics by screws 163, said connecting rods being held between said flanges. The eccentrics are mounted fast on a shaft 165 journalled in bearings in the cross-head provided with bushings 167 and 169. On one end of the shaft 165 is a nut 171 engaging a flange on the bushing 169, and on the other end of the shaft is a mitre gear 173 meshing with a mitre gear 175 (Figs. 2 and 3) on a shaft 177 extending parallel to the cross-head and journalled in a bracket 179 secured to the cross-head and in a bracket 181 (Figs. 2, 3, 7 and 8) secured to the rear trunnion of the cross-head by a fin 183 and screws 185, the fin being entered into a corresponding recess in the trunnion.

Fast on the rear end of the mitre gear shaft 177 is an arm 187 having a slot 189 therein receiving a slide block 191. A rock arm 193 has one end pivotally connected to the block and its opposite end pivotally mounted on a shaft 195 on the bracket 181. A connecting rod 197 has its upper end pivotally connected to the slide block and its lower end pivotally connected to a crank wrist pin 199 on a disk 201 secured to the crank wrist pin 69 on the main shaft 71 at the rear side of the machine.

The construction is such that on rotation of the disk 201, the connecting rod 197 will operate through the slide block, slotted arm and rock arm to oscillate the mitre gear shafts and the eccentrics, thereby alternately to buckle and straighten the toggles and move the embosser-head up and down with positive action.

Figure 14:
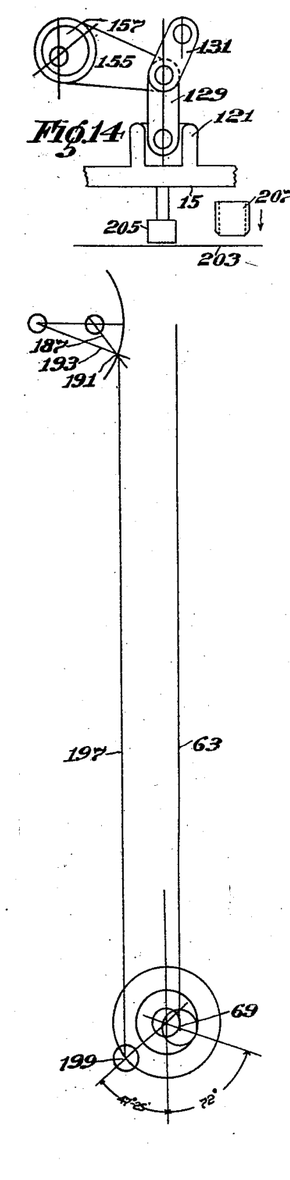
Figs. 14, 15 and 16 are diagrammatic views to facilitate understanding of the operation of the embosser control mechanism.
Figure 15:
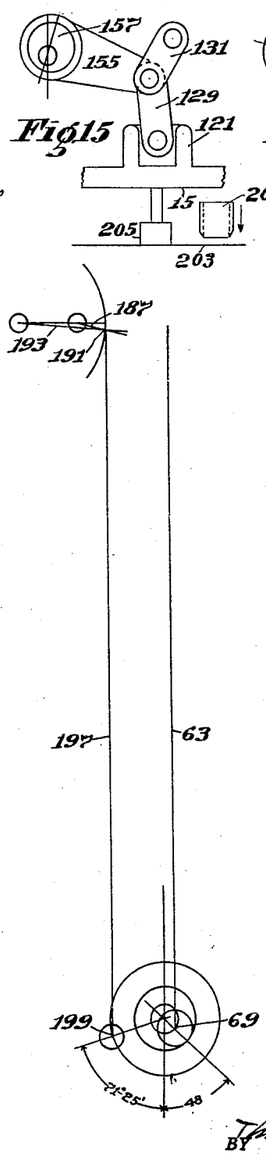
Figure 16:
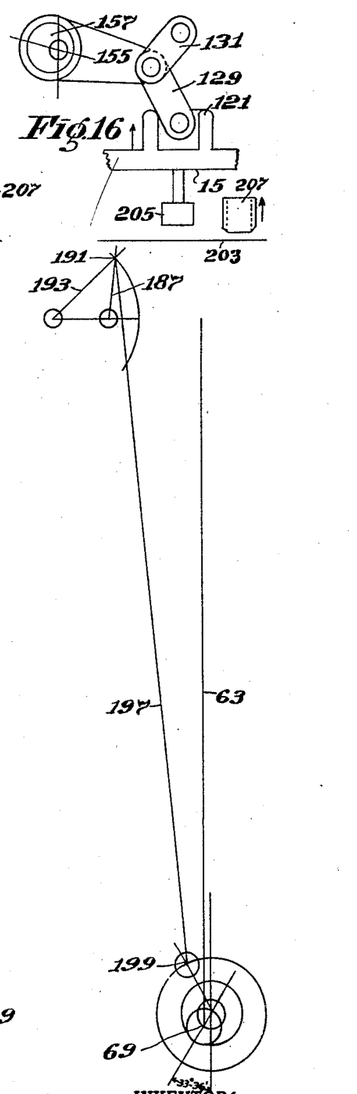

The operation may be more readily understood by reference to the diagrammatic Figures 14, 15 and 16. For convenience the line 203 may be regarded as the upper surface of the dough sheet, 205 designates one of the embossers, and 207 designates one of the cutters. When the embosser is about to engage the dough sheet, the eccentrics, slotted arm, rock arm, embosser crank pin 199 and cutter crank pins 69 will be in the positions shown in Fig. 14. The embosser crank pin is about to move through an arc of its orbit which will impart the most rapid longitudinal movement to the connecting rod 197, and the block in the slotted arm will be approaching its position of shortest effective radius.

On turning of the eccentrics to the position shown in Fig. 15, the embosser crank pin 199 will be in a position in its orbit still nearer to the portion thereof where it is effective to impart highest speed longitudinal movement to the connecting rod 197, and the slide block in the slotted arm will be still nearer to its shortest effective radius. The effective radius of the embosser crank pin 199 is now considerably longer than the effective radius of the slide block, and the movement of the former is multiplied at the latter. When the parts are in their positions shown in Fig. 15, the embosser is down to its lowest limit and is in engagement with the dough sheet.

Next the eccentrics receive their highest speed rocking movement in order quickly to buckle the toggles, and quickly lift the embossers up from the dough sheet. In the course of this movement the embossers crank pin 199 and the slide block will move from their positions shown in Fig. 15 to their positions shown in Fig. 16. It will be noted in the latter figure that the slide block has moved outward in the slotted arm toward the end thereof to its position of longest radius. The cross-head continues to move down, thereby causing the cutter to die out the embossed biscuit from the dough sheet. The eccentrics are then rocked in the opposite direction to restore the toggles to their straightened condition in readiness for the next cycle of operations.

When the embosser is in its position shown in Fig. 15 in engagement with the dough sheet, the cutter is about to enter the sheet and will die out a biscuit directly after the embosser leaves the sheet. It is essential that the embosser should leave the sheet before the cutter touches the sheet in order to prevent vacuum effect in the cutter which would suck up the dough sheet on rise of the embosser therein. On upward movement of the embosser, the cutter will clear the dough sheet from the embosser. In Fig. 16 the cutter is starting on its upward movement and will move up beyond the embosser so that the latter will serve to clear the died out biscuit from the cutter. The clearer plate will clear from the cutter the scrap surrounding the died-out biscuit.

Enormous pressure is brought to bear upon the embosser-head the instant the embossers contact with the dough sheet, and therefore it is essential that the embosser control mechanism shall be of sturdy construction and yet of a design in which parts are sufficiently light to enable high speed operation. When the embosser-head is under its highest pressure, the toggles are approximately in straightened condition, and through the nearly straight vertical lines of their links bear the brunt of this pressure. The lateral component transmitted through the connecting rods to the eccentrics is relatively small as compared to the pressure on the toggles, and thus the eccentrics, mitre gears, the slotted arm and the embosser wrist pin may be of relatively light construction.

The toggle control mechanism is simple in construction, and has a harmonious motion avoiding vibration and noise, and is designed to withstand the duty which it is called upon to perform with minimum wear.

This machine may be employed to emboss and die out biscuits or merely to die out biscuits. In the latter use the rock arm 193 and the connecting rod 197 may be removed. Then the slotted arm may be swung upward until its slot is in registration with an eye 209 (Fig. 6) on the bracket 181. A pin 211 (Fig. 7) is mounted in the eye and has a pair of circumferential grooves 213 adapted to be engaged by a spring-pressed ball 215, the construction being such that the pin may be slid in the eye so that an end thereof enters the slot 189 of the slotted arm, thereby to hold said arm up in inoperative position. The spring-pressed ball will enter one of the grooves to hold the pin in the slot and enter the other groove to hold the pin in withdrawn position.

When the machine is used to cut but not emboss biscuits, a cutter unit is substituted for the cutter and embosser unit, and is adapted merely to cut biscuits. The purpose of removing the rock arm and connecting rod is to relieve the toggles and their actuating mechanism from idle motion and consequent wear.

When it is desired to remove the cutter and embosser unit from the cross-head, the nuts 43 of the bolts 37 which hold the unit to the bar are loosened, and the pins 123 connecting the toggles with the lugs 121 are withdrawn, allowing swinging of the toggles away from the lugs. Now the unit is free to be moved laterally away from the bolts 37.

It will be observed that the toggles are directly connected with the lugs which are formed integrally with the embosser-head, and therefore, on oscillation of the eccentrics and alternate straightening and buckling of the toggles, the embosser-head will be positively reciprocated relatively to the cutter-head. The embossers are positively controlled in all their movements.

While the machine has been described more particularly in respect to embossing and cutting out biscuits from a dough sheet, other plastic materials might be operated upon.

It will be understood that the invention is not limited to the specific embodiment shown, and that various deviations may be made therefrom without departing from the spirit and scope of the appended claims.

What is claimed is:

1. A machine of the character described comprising, in combination, a reciprocable cross-head, an embosser carried thereby for embossing material, toggles carried by the cross-head connected to the embosser, and means for automatically, positively straightening and buckling the toggles to control the embosser.

2. A machine of the character described comprising, in combination, a reciprocable cross-head, an embosser carried thereby, toggles on the cross-head connected to the embosser, and means for automatically straightening and buckling the toggles including a pair of eccentrics on the cross-head and connecting rods connecting the eccentrics with the toggles.

3. A machine of the character described comprising, in combination, a reciprocable cross-head, an embosser carried thereby, toggles on the cross-head connected to the embosser, and means for straightening and buckling the toggles including eccentrics on the cross-head, connecting rods connecting the eccentrics with the toggles, and means for oscillating the eccentrics.

4. A machine of the character described comprising, in combination, a reciprocable cross-head, an embosser-head carried thereby having embossers for embossing material, toggles carried by the cross-head and connected to the embosser-head, and eccentric means for automatically, alternately straightening and buckling the toggles.

5. A machine of the character described comprising, in combination, a reciprocable cross-head; a unit carried by said cross-head comprising a cutter-head having cutters, and an embosser-head having embossers and reciprocable relatively to the cutter-head; and means for controlling the embossers including toggles carried by the cross-head and connected to the embosser-head, and means for automatically, alternately straightening and buckling the toggles.

6. A machine of the character described comprising, in combination, a reciprocable cross-head, an embosser-head having embossers for embossing material, toggles carried by the cross-head and connected to the embosser-head, eccentrics on the cross-head, connecting rods connecting the eccentrics with the toggles, and means for actuating the eccentrics to hold the toggles in straightened condition on advance of the cross-head toward the material, and for buckling the toggles to retract the embossers from the material on completion of the embossing operation.

7. A machine of the character described comprising, in combination, a reciprocable cross-head, an embosser-head carried thereby having embossers for embossing material, toggles on the cross-head connected to the embosser-head, eccentrics on the cross-head, connecting rods connecting the eccentrics with the toggles, and means for automatically oscillating the eccentrics having provision for imparting rapid rocking movements thereto quickly to buckle the toggles to withdraw the embossers from the material on completion of the embossing operation.

8. A machine of the character described comprising, in combination, a reciprocable cross-head, an embosser carried thereby for embossing material, toggles on the cross-head connected to the embosser, eccentrics on the cross-head, connecting rods connecting the toggles and eccentrics, and means including a crank motion for oscillating the eccentrics alternately to buckle and straighten the toggles.

9. A machine of the character described comprising, in combination, a cross-head, embossers carried thereby for embossing material, a shaft having cranks, connecting rods between the cranks and cross-head for reciprocating the latter, toggles on the cross-head connected to the embossers, eccentrics on the cross-head, connecting rods connecting the eccentrics with the toggles, and means operated by one of said cranks for operating said eccentrics to buckle and straighten the toggles.

10. A machine of the character described comprising, in combination, a cross-head, embossers carried thereby for embossing material, a shaft, means actuated by said shaft for reciprocating the cross-head, toggles carried by the cross-head connected to the embossers, eccentrics on the cross-head, connecting rods connecting the toggles and eccentrics, and means operated by said shaft for actuating the eccentrics alternately to straighten and buckle the toggles.

11. A machine of the character described comprising, in combination, a cross-head, embossers carried thereby for embossing material, a shaft having cranks, connecting rods extending between the cranks and cross-head to reciprocate the latter, toggles on the cross-head connected to the embossers, eccentrics on the cross-head, connecting rods connecting the eccentrics and toggles, and means to oscillate the eccentrics including a shaft for the eccentrics, a rock shaft on the cross-head, intermeshing gears on said shafts, an arm on the rock shaft having a slot, a slide block in said slot, a disk on one of said cranks having a wrist pin, and a connecting rod connecting the slide block with the wrist pin.

12. A machine of the character described comprising, in combination, a cross-head, embossers carried thereby for embossing material, a shaft having cranks, connecting rods extending between the cranks and the cross-head to reciprocate the latter, toggles on the cross-head connected to the embossers, eccentrics on the cross-head, connecting rods connecting the toggles and eccentrics, and means to oscillate the eccentrics including a shaft for the eccentrics, a rock shaft on the cross-head, intermeshing gears on said shafts, an arm on the rock shaft having a slot, a slide block in said slot, a disk on one of the cranks having a wrist pin, a connecting rod connecting the slide block with the wrist pin, and a rock arm on the cross-head and pivotally connected to the slide block for controlling variation in the effective radius of the slide block.

13. A machine of the character described comprising, in combination, a reciprocable cross-head, embossers carried by said cross-head for embossing material, toggles carried by the cross-head connected to the embossers, and means for operating the toggles including a pair of eccentrics on the cross-head and a double crank motion for oscillating the eccentrics having provision for automatically varying the effective radius of one of the cranks, thereby to impart rapid movements to the eccentrics to give the toggles a rapid buckling motion and quickly withdraw the embossers from the material on completion of the embossing operation.

14. A machine of the character described comprising, in combination, a reciprocable cross-head, an embosser-head carried thereby having embossers, toggles on the cross-head connected to the embosser-head, and means for adjusting the toggles to raise or lower the embosser-head relatively to the cross-head to vary the depth of the embosser impressions on the material, and that the embossers may emboss materials of different thicknesses.

15. A machine of the character described comprising, in combination, a reciprocable cross-head, a cutter carried thereby for cutting articles from sheet material, means for reciprocating the cross-head, an embosser carried by the cross-head, and means connected to the cross-head and embosser for positively moving the embosser up and down relatively to the cross-head.

16. A machine of the character described comprising, in combination, a reciprocable cross-head, a cutter carried thereby, means for reciprocating the cross-head to cause the cutter to die out articles from sheet material, an embosser carried by the cross-head for embossing the material, and means for positively controlling the embosser including toggle means connected to the cross-head and embosser, and means connected to the toggle means for alternately straightening and buckling the toggle means.

17. A machine of the character described comprising, in combination, a reciprocable cross-head, a cutter-head carried thereby having cutters for dieing out articles from sheet material, an embosser-head carried by the cross-head having embossers for embossing the material, and means for controlling the embosser-head including means on the cross-head for positively causing the embossers to move down with the cross-head in advance of the cutters, and for positively lifting the embosser-head relatively to the cutter-head on completing embossing of the material.

18. A machine of the character described comprising, in combination, a cross-head reciprocable vertically and horizontally simultaneously, an embosser for embossing material, toggles carried by the cross-head connected to the embosser, and means for automatically positively straightening and buckling the toggles to control the embosser.

19. A machine of the character described comprising, in combination, a cross-head simultaneously reciprocable in two directions at an angle to each other, an embosser for embossing material, toggles carried by the cross-head connected to the embosser, and means for automatically positively straightening and buckling the toggles to control the embosser.

THOMAS LUTHER GREEN.